(12) United States Patent
Chen et al.

(10) Patent No.: US 7,042,942 B2
(45) Date of Patent: May 9, 2006

(54) ZIGZAG IN-ORDER FOR IMAGE/VIDEO ENCODER AND DECODER

(75) Inventors: Yen-Kuang Chen, Sunnyvale, CA (US); Wen-Hsiao Peng, Hsinchu Shien (TW)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 10/028,402

(22) Filed: Dec. 21, 2001

(65) Prior Publication Data

US 2003/0138042 A1      Jul. 24, 2003

(51) Int. Cl.
| | |
|---|---|
| H04B 1/66 | (2006.01) |
| H04N 11/02 | (2006.01) |
| H04N 11/04 | (2006.01) |
| H04N 7/12 | (2006.01) |

(52) U.S. Cl. .................................. 375/240.03
(58) Field of Classification Search ............. 375/240.2, 375/240.3, 240.12, 240.18, 240.19, 240.22, 375/240.23, 240.24, 240.03; H04N 7/12
See application file for complete search history.

(56) References Cited

U.S. PATENT DOCUMENTS

| | | | | |
|---|---|---|---|---|
| 5,767,910 A | * | 6/1998 | Iizuka | 375/240.2 |
| 5,825,419 A | * | 10/1998 | Mishima et al. | 375/240.15 |
| 5,959,872 A | * | 9/1999 | Son | 708/402 |
| 5,995,150 A | * | 11/1999 | Hsieh et al. | 375/240.12 |
| 6,009,203 A | * | 12/1999 | Liu et al. | 382/233 |
| 6,011,584 A | * | 1/2000 | Allred et al. | 348/241 |
| 6,275,531 B1 | * | 8/2001 | Li | 375/240.12 |
| 6,332,194 B1 | * | 12/2001 | Bloom et al. | 713/176 |
| 6,343,098 B1 | * | 1/2002 | Boyce | 375/240.03 |
| 6,453,073 B1 | * | 9/2002 | Johnson | 382/239 |
| 6,587,590 B1 | * | 7/2003 | Pan | 382/250 |
| 6,650,707 B1 | * | 11/2003 | Youn et al. | 375/240.12 |
| 6,771,703 B1 | * | 8/2004 | Oguz et al. | 375/240.03 |
| 2003/0026490 A1 | * | 2/2003 | Thyagarajan | 382/244 |
| 2003/0118243 A1 | * | 6/2003 | Sezer et al. | 382/245 |

OTHER PUBLICATIONS

Pennebaker & J. L. Mitchell W. B., "Chapter 10: JPEG Coding Models," JPEG Still Image Data Compression, 1992, pp. 169-173, New York, USA, XP-002126854.

"Information Technology-Coding of Audio-Visual Objects-Part 2: Visual Amendment 4: Streaming Video Profile," ISO/IEC JTC1/SC29/WG11 N3518, Jul. 21, 2000, pp. 1-55, Beijing, China, XP-001014368.

Weiping Li, "Overview of Fine Granularity Scalability in MPEG-4 Video Standard," IEEE Transactions on Circuits and Systems for Video Technology, IEEE, Inc., vol. 11, No. 3, Mar. 2001, pp. 301-317, XP-000994715.

* cited by examiner

*Primary Examiner*—Nhon Diep
(74) *Attorney, Agent, or Firm*—Molly A. McCall

(57) ABSTRACT

In an encoding or decoding process for compressible data, non-raster ordered bitstreams of transform data are rearranged in memory so later data access is contiguous, efficiently allowing processing in a single cache line. In an encoder, rearrangement can utilize a buffer copy that enables address calculation to performed only once per block.

18 Claims, 7 Drawing Sheets

ZIGZAG IN-ORDER FOR IMAGE/VIDEO ENCODER AND DECODER

FIELD OF THE INVENTION

The present invention relates to the field of digital processing and, in particular, to a method and apparatus for optimizing video encoders and decoders to facilitate real-time video transmission.

BACKGROUND

Encoding, transmitting, and decoding video signals is a processor and bandwith intensive process. Typically, analog video must be converted into a digital form, and transmitted as a bitstream over a suitable communication network. When the bitstream arrives at the receiving location, the video data are converted back to a viewable form by decoding. Due to bandwidth constraints of communication channels, video data are often compressed prior to transmission on a communication channel.

One compression technique that takes into account the variable bandwidth availability of communication channels is known as progressive encoding. While any data set that supports lossy compression can be progressively encoded, it is particularly useful for still and video images. Instead of slowly building an accurate image in a single pass, a progressively encoded image quickly provides a crude approximation of the final image, and as time and bandwidth permits, refines the image in later passes. For example, video data can be divided into a "base layer" and one or more "enhancement layers" prior to transmission. The base layer includes a rough version of the video sequence and may be transmitted using comparatively little bandwidth. Typically, the enhancement layers are transmitted at the same time as the base layer, and recombined at the receiving end with the base layer during the decoding process. The enhancement layers provide correction to the base layer, permitting video quality improvement. As will be appreciated, transmitting more enhancement layers produces better output video, but requires more bandwidth. While progressive encoding eases bandwidth constraints, it requires substantially more processor time for encoding and decoding the video signal.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
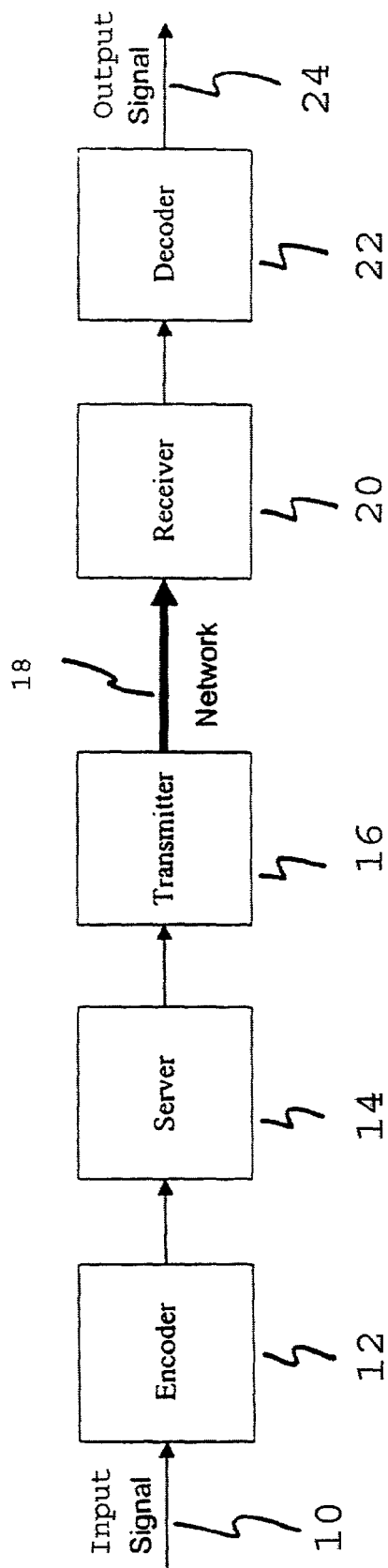
FIG. 1 is a functional block diagram showing a path of a video signal.

FIG. 1 is a block diagram showing one example of path taken by a complex data set distributable over a network. The data set can be any large data set that supports lossy compression or transmission, and will typically be an audio, image, or video signal. In FIG. 1, an input video signal 10 is fed into an encoder 12 supporting a digital processor, which converts the signal 10 into video data in the form of a machine-readable series of bits, or bitstream. The video data are optionally stored on a server 14, pending a request for the video data from a client. When the server 14 receives a request for the video data, it sends the data to a transmitter 16, which transmits the data along a communication channel 18 on the network. A receiver 20 of the client receives the data and sends it as a bitstream to a decoder 22 supporting a digital processor. The decoder 22 converts the received bitstream into an output video signal 24, which may be then be viewed.

As will be understood, the respective digital processors of the encoder 12 and the decoder 22 can be special purpose digital signal processors, or general purpose microprocessors based on Intel architecture. In addition, although not required, the encoded video data can be indefinitely stored in magnetic or optical media in server 14, awaiting a transaction request for the data by a client. Typically a client is an application which requests resources, such as the video data, from the server 14. When a client makes a request to the server 14 for the video data along a communication channel supported by network 18, a processor in the server 14 determines the amount of bandwidth on the network 18. There are many ways in which the server may ascertain the amount of available bandwidth. One way is to have bandwidth information provided by the client. A processor in the server further determines how many enhancement layers may be reliably transmitted along the channel, within the available bandwidth.

To maximize usage of this available bandwidth, the encoding done in encoder 12 typically involves lossy compression techniques such as MPEG4-FGS, resulting in a base layer sufficient to permit generation of a viewable video sequence of lesser quality than is represented by the source video sequence. The base layer comprises a low-bandwidth version of the video sequence. If it were to be decoded and viewed, the base layer would be perceived as an inferior version of the original video. Enhancement techniques at the receiving end, to be discussed below, compensate for the missing data and produce a smooth and aesthetically pleasing output video.

Enhancement layers may capture the difference between a quantized/truncated base video picture and an original unquantized input video picture. Enhancement layers enhance the quality of the viewable video sequence generated from the base layer. Combining the base layer with a single enhancement layer at the receiving end produces a correction to the video data and an improved output video. Combining an additional enhancement layer provides additional correction and additional improvement. Combining the base layer with all enhancement layers at the receiving end will result in a video output of quality nearly equal to the original input video.

Typically each enhancement layer would be one "bit slice" or "bit plane" of the difference data. In such an arrangement, each enhancement layer for each picture would consist of a series of bits. The enhancement layers are ordered in such a way that the first enhancement layer would contain the most significant bits, the second enhancement layer would contain the next most significant bits, and so on. This means that the most significant correction would be made by the first enhancement layer. Combining more enhancement layers would continue to improve the output quality. In this way, the quality of the output video can be "scaled" by combining different numbers of enhancement layers with the base layer. The process of using fewer or more enhancement layers to scale the quality of the output video is referred to as "Fine Granularity Scalability" or FGS. FGS may be employed to produce a range of quality of output video.

Although combining the base layer and all enhancement layers during the decoding process will produce an output video with picture quality nearly equal to the input video, bandwidth constraints of the communication channel supported by network 18 may make this result unfeasible. Bandwidth constraints may allow some, but not all, enhancement layers to be transmitted with the base layer. FGS permits the base layer and enhancement layers to be stored in the memory of a server. Then the base layer can be transmitted with a number of enhancement layers suitable for the bandwidth of the particular channel. In general, the greater the bandwidth of the channel, the more enhancement layers may be transmitted along with the base layer, and the better the quality of the resultant output video.

Figure 2:
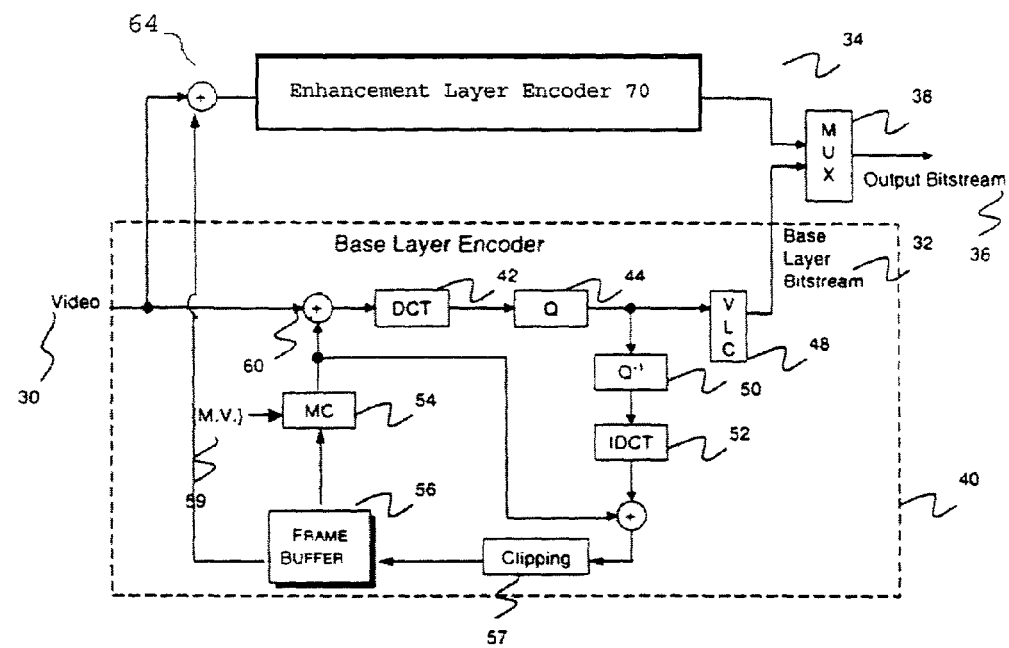
FIG. 2 is a block diagram showing video encoding and compression;.

FIG. 2 demonstrates one embodiment suitable for encoding and compression of a series of input pictures 30, resulting in a base layer bitstream of the video data 32 plus a bitstream of one or more enhancement layers 34. The base layer bitstream 32 and enhanced layer bitstream 34 may be combined into a single output bitstream 36 by a multiplexer (Mux) 38. The base layer may be created by standard video encoding and compression techniques 40. The encoding and compression techniques 40 shown in FIG. 2 are illustrative but are not the only way to achieve encoding and compression. Encoding and compression may employ a discrete cosine transform (DCT) 42, quantization (Q) 44, and variable length coding (VLC) 48. FIG. 2 also includes techniques for encoding the changes between individual pictures, which include inverse quantization (IQ) 50, an inverse discrete cosine transform (IDCT) 52, motion compensation (MC) 54 with motion vectors ({M.V.}) 59 from motion estimation, frame store 56, and subtraction 60 of an earlier picture 62 from the input picture stream 30 to isolate the changes from one picture to the next.

FIG. 2 also shows a subtraction 64 which results in the creation of enhancement layers which contain the various bits of the difference between the quantized base video (also known as, reconstructed pictures) and the unquantized input video. In FIG. 2, the enhancement layers corresponding to each picture represent enhancements to the changes between individual pictures, rather than enhancements to the individual pictures themselves. When the enhancement layer data are arranged into individual enhancement layers, the first enhancement layer would contain the most significant bits of enhancement data, the second enhancement layer would contain the next most significant bits of enhancement data, and so on. These arrangements of bits may be called "bit planes" and they may be generated by enhancement layer encoder 78.

As will be appreciated by those skilled in the art, as compared to single layer video codecs, supporting multiple enhancement layers in addition to the base video layer often requires additional processing power to provide timely encoding or decoding of the bit stream mainly to accomplish multiple separate bitwise extractions and insertions for each bitplane associated with each enhancement layer. For example, encoding even a single enhancement layer with six bit planes by the enhancement layer encoder 78 would require six scans, all involving relatively slow bit extraction operations.

Figure 3:
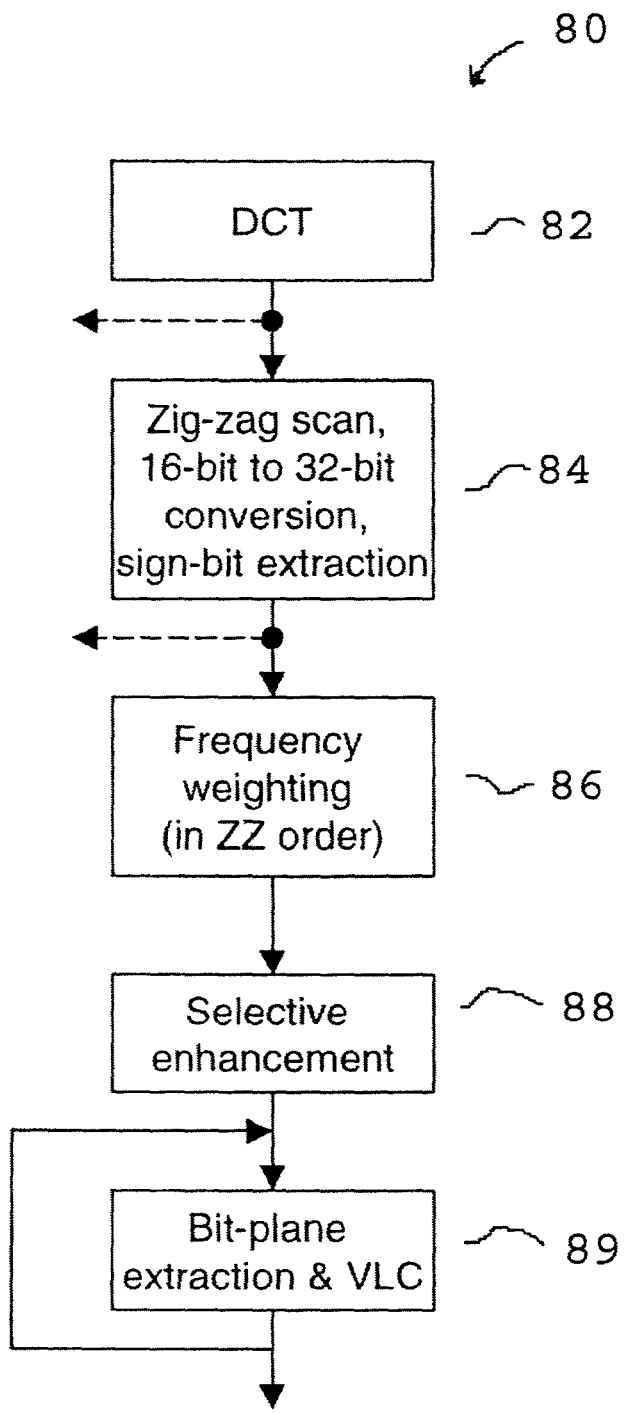
FIG. 3 is a more detailed view of the enhancement layer encoding module of FIG. 2.

FIG. 3 illustrates various bitwise operations of the enhancement layer encoder 78 of FIG. 2. The present invention minimizes the number of required address calculations and shift operations by the digital processor used for enhancement layer encoding by providing for a non-raster scan, typically using a zigzag scan pattern, for rearranged data in. As seen in FIG. 3, the encoding 80 process includes application of a discrete cosine transform (DCT 82), the zigzag scan pattern, any 16 to 32 bit conversions, and sign bit conversion (block 84). Frequency weighting is done in zigzag order (block 86) on DCT coefficients that are already zigzag ordered, followed by selective enhancement (block 88) of the data, and repeated bit plane extraction and coding by VLC (block 89).

Figure 4:
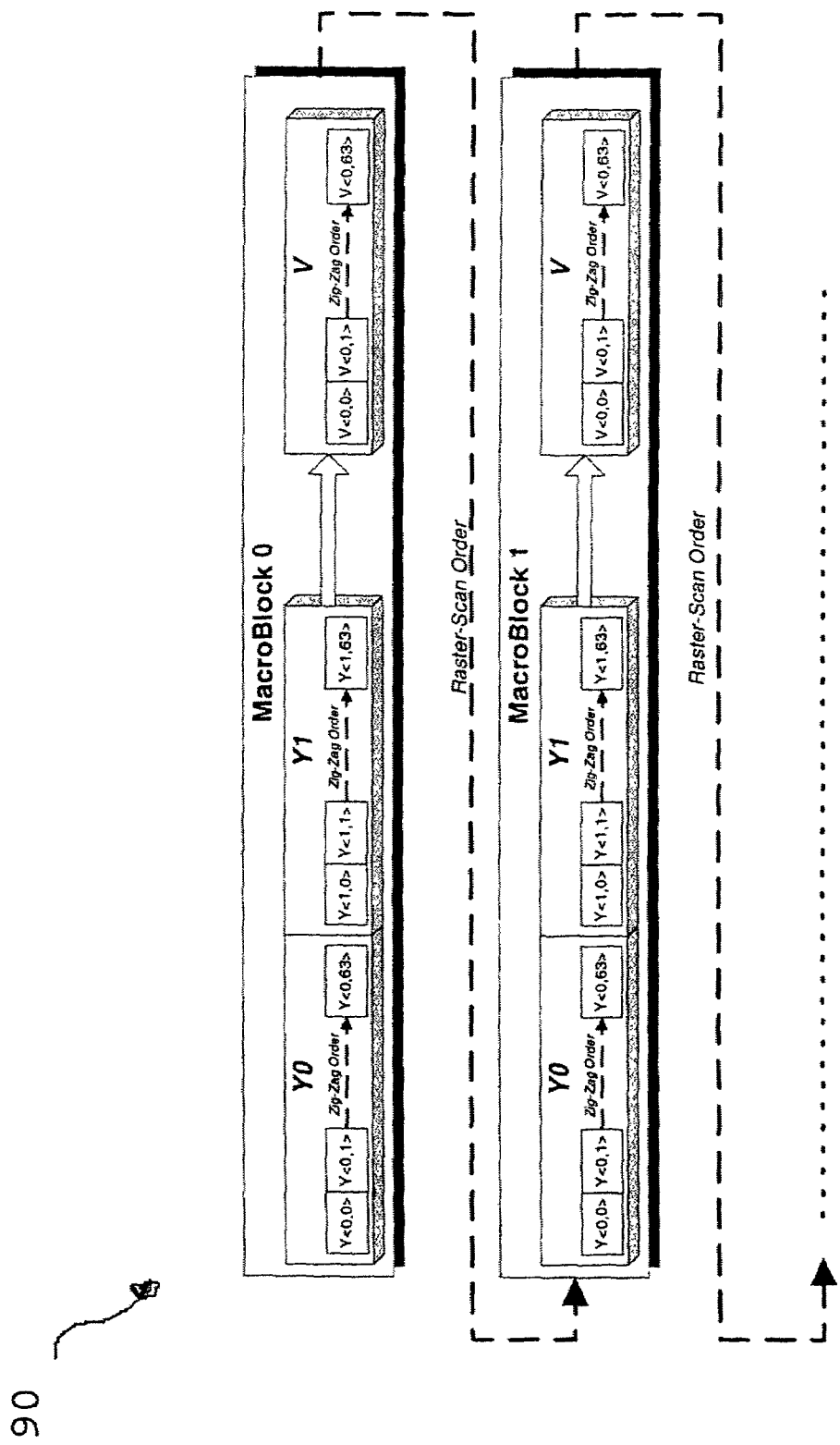
FIG. 4 is a representative memory layout for macroblock data.

As seen in FIG. 4, in operation the DCT coefficients are not stored in the typical raster scan order of conventional encoders/decoders, but are instead zigzag ordered in the macroblocks 90. Overall, this requires use of an additional buffer copy, but reduces address calculations to once per block.

This operation is best appreciated with reference to the following pseudocode:

```
for (different blocks)
{
  for (different positions)
  {
    sign_bit[position] = (dct_block_buffer[zig_zag[position]]>0)?0:1;
    block_buffer[position] = abs(dct_block_buffer[zig_zag[position]]);
  }
  for (different positions)
  {
    block_buffer'[position] = block_buffer[position] >>
(fw[i_zig_zag[position]] + se);
  }
}
for (different bitplanes)
{
  and_mask' = and_mask << bitplane;
  for (different blocks)
  {
    while (position <= last_position)
    {
      if (block_buffer'[position] & and_mask')
      {
        eop=(position==last_position)?1:0;
        Coding <run, eop> Symbol
        run=0;
      }
      else
        run++;
      position++;
    }
  }
}
```

After the foregoing rearrangement, the data access now can be performed in contiguous manner and only requires use a simple incremental counter, replacing computationally costly address calculations of non-zigzag ordered data.

The representative memory layout for YUV macroblock data processed of FIG. 4, shows zigzag ordered memory layout. With suitable modifications, this type of memory layout scheme can be to existing DCT based coding schemes (e.g. MPEG or JPEG), or other transforms requiring zigzag or other non-raster orders scans.

Figure 5:
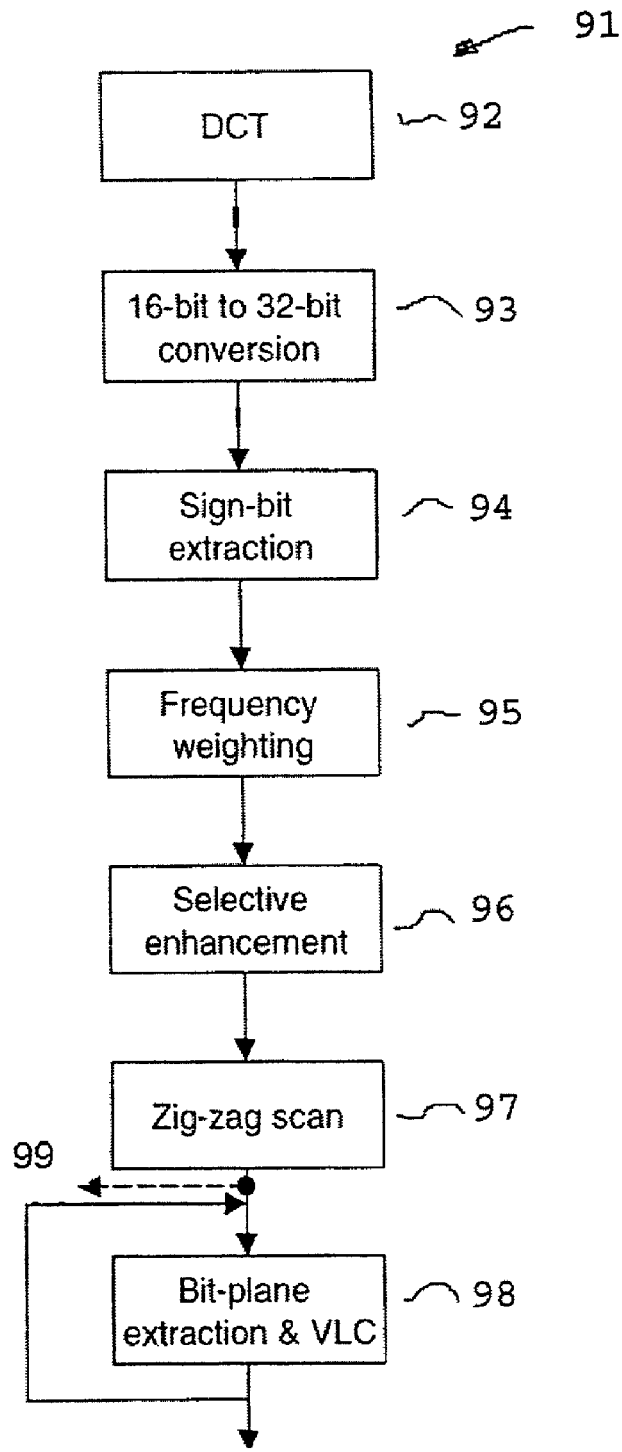
FIG. 5 is a detailed view of an alternative enhancement layer encoding module.

The memory layout scheme of FIG. 4 can also be used in an alternative zigzag processing embodiment shown in FIG. 5. In a manner similar to that described in FIG. 3, an additional buffer point 99 is created after the zigzag scan to store DCT coefficients in zigzag scan order. Again this places data in memory in data processing order, reducing address calculation to only once per macroblock processed.

This operation is best appreciated with reference to the following pseudocode:

```
for (different blocks)
{
  for (different positions)
  {
    sign_bit[position] = (dct_block_buffer[position]]>0)?0:1;
    block_buffer[position] = abs(dct_block_buffer[position]);
  }
  for (different positions)
  {
    block_buffer'[position] = block_buffer[position] >> (fw[position]] + se);
  }
}
for (different positions)
{
  block_buffer"[position] = block_buffer[zig_zag [position] ];
}
}
for (different bitplanes)
{
  and_mask' = and_mask >> bitplane;
  for (different blocks)
  {
    while (position <= last_position)
    {
      if (block_buffer"[position] & and_mask')
      {
        eop=(position==last_position)?1:0;
        Coding <run, eop> Symbol
        run=0;
      }
      else
        run++;
      position++;
    }
  }
}
```

Similar to the method described with reference to FIG. 4, this pseudocode illustrated method requires an extra buffer copy prior to bit plane extraction. The data access for bit-plane extraction & VLC shifting remains sequential as compared to conventional zigzag addressing techniques.

Figure 6:
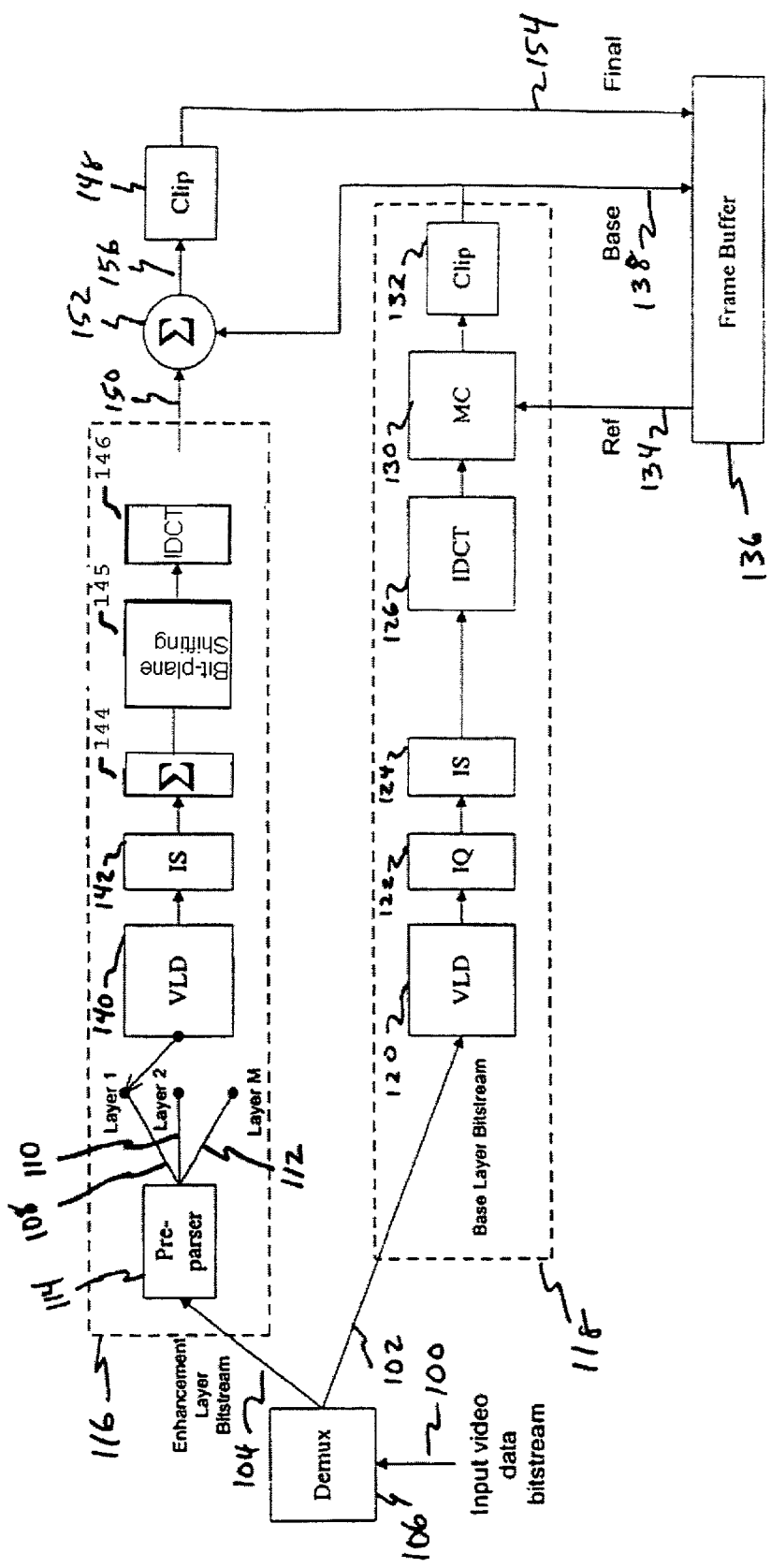
FIG. 6 is a block diagram showing video decoding.

FIG. 6 demonstrates a method for decoding and recovery of video data that has been transmitted by a server over a communication channel and received by a client. At the receiving end, the input to the decoder includes a bitstream of video data 100. The bitstream of video data 100 may be separated into a bitstream of base layer data 102 and a bitstream of enhancement layer data 104. A demultiplexer (Demux) 106 may be used to separate the bitstreams.

The base layer and the enhancement layers may be subjected to different decoding processes, or "pipelines" 116, 118. Just as the encoding of base and enhancement layers may not have involved identical steps, there may be some differences in the decoding processes as well. In the base layer decoding pipeline 118, the base layer may undergo variable length decoding (VLD) 120, an inverse quantization (IQ) 122, an inverse scan (IS) 124, and an inverse discrete cosine transform (IDCT) 126. The VLD 120, IQ 122, IS 124 and IDCT 126 operations essentially undo the VLC 48, Q 44, S 46 and DCT 42 operations performed during encoding shown in FIG. 2. Decoded base layer data may then be processed in a motion compensator (MC) 130, which may reconstruct individual pictures based upon the changes from one picture to the next. Data from a previous, or "reference" picture 134 may be stored in a temporary memory unit called a "frame buffer" 136 and may be used as a reference. Decoded data from the IDCT 126 will be used by the MC 130 to determine how the next picture in the sequence changes from the previous picture. Because the IDCT 126 may result in the creation of invalid video data, a "clip" function 132 is used to adjust the data. For example, a valid video datum may be any number between 0 and 255 inclusive, with 0 representing a black pixel and 255 representing a white pixel. If the IDCT operation 126 returns an invalid negative number, the clip operation 132 may set that datum to 0, making the datum valid. Similarly, if the IDCT operation 126 returns a number greater than 255, the clip operation 132 may set that datum to 255. The output of the base layer pipeline 118 is base layer video data 138. The decoding techniques shown in FIG. 6 are illustrative but are not the only way to achieve decoding.

The decoding pipeline for enhancement layers 116 is different from the decoding pipeline for the base layer 118. The enhancement layer bitstream 104 may be further separated into individual bitstreams of enhancement layer data 108, 110, 112, one bitstream for each enhancement layer. A pre-parser 114 may be used to separate the enhancement layer bitstream into individual bitstreams of enhancement layer data 108, 110, 112. The pre-parser 114 may use the bit plane start codes inserted during the encoding process 76 to accomplish the pre-parsing. Pre-parsing permits the data for each enhancement layer 108, 110, 112 to be decoded in parallel.

In FIG. 6 several enhancement layers 108, 110, 112 for a single picture may need to be decoded. Each enhancement layer may undergo a VLD process 140, and an inverse scan (IS) process 142. Because of the frequency weight and selective enhancement, a bit plane shifter 145 can be used to adjust bit plane values.

After completion of IS process 142, the enhanced layers may be accumulated in a bit plane accumulator 144. The bit plane accumulator 144 places the most significant bit for each bit plane in its correct place, the next most significant bit in its place, and so forth. If fewer than all enhancement layers had been transmitted by the server, the bit planes may not be fully filled, and some data in the bit planes may be indeterminate. Several routines for filling out the bit planes may be employed. For example, the sites for the least significant bits may simply be filled with random noise. The bit planes may then undergo an IDCT operation 146.

The output 150 from the enhancement layer pipeline 116 represents a correction which is then summed 152 with the base layer video 138. The output from the summing operation 156 may undergo a clip function 148 to eliminate out-of-bounds data. The output 154 from the clip function 148 is a final version of a picture, enhanced to the extent permitted by the channel bandwidth, and ready for viewing. This picture may be stored in the frame buffer 136, and may serve as a reference 134 for the picture to follow. A typical viewer will read data from the frame buffer 136, which can provide a steady stream of video picture data to the viewer.

As those skilled in the are will appreciate, the decoder shown in FIG. 6 can be modified while still providing substantially the same functionality. Some of the operations depicted in FIG. 6 are linear, and may appear in a different order without affecting the output. Summation 152 of the base layer and the enhancement layer, for example, may be performed prior to IDCT operations 126 or 146. Furthermore, in an alternative embodiments, many of the operations in the enhancement layer may be done in a serial manner rather than in parallel. For example, in another embodiment the enhancement layer is generated by using an alternative FGS that encodes video data frames into a base layer of relatively low quality video and multiple arbitrarily scalable enhancement bit-plane layers of increasingly higher quality video. Alternatively, selection of the prediction mode can be adaptively performed by comparing a subsection of the input video (e.g., a macroblock) with a subsection of the previous enhancement frame, the current reconstructed base layer, and/or compare with a combination of the previous enhancement frame and the current reconstructed base layer.

Figure 7:
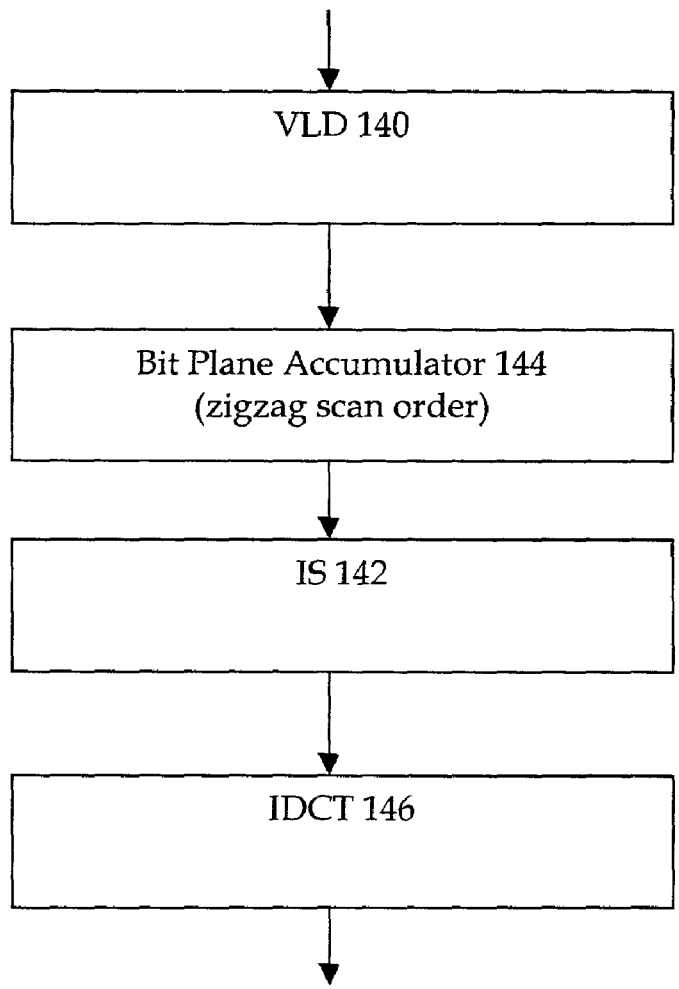
FIG. 7 is an alternatively ordered decoding process.

Certain embodiments permit performance of an inverse scan after bit plane shifting. As seen in FIG. 7, a variable length decoder (VLD 140) processes data, passing data to a bit plane accumulator 142 that zigzag orders the data. The data is bit plane shifted and inversed scanned (block 144) priori to IDCT 146 processing. Advantageously, this ordering only requires one inverse scan per macroblock decoded.

The methods, encoders, and decoders described above can be stored in the memory of a computer system (e.g., set top box, video recorders, etc.) as a set of instructions to be executed. In addition, the instructions to perform the method, encoders, and decoders as described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods, encoders, and decoders as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc. Furthermore, the encoders and decoders as described above could be implanted on the same hardware component, such as a graphics controller that may or may not be integrated into a chipset device.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   providing a data set including an ordered matrix of coefficients;
   placing the data set in data processing order by scanning and rearranging the ordered matrix of coefficients of the data set in memory with a non-raster order scan; and
   accessing the rearranged data set in memory in a contiguous manner to convert the rearranged data set into a coded data set, wherein frequency weighting is done in zigzag order on the ordered matrix of coefficients, and wherein converting the rearranged data set into a coded data set further comprises performing bit plane extraction on the rearranged data set in memory.

2. The method of claim 1, further comprising the step of storing the rearranged data set in a memory buffer before performing the bit plane extraction step.

3. The method of claim 1, wherein the data set is visual information.

4. The method of claim 3, wherein the visual information is encoded with a progressive encoder to create a base layer and at least one enhancement layer.

5. The method of claim 1, further comprising the step of encoding visual data using transform coding to create the ordered matrix of coefficients.

6. The method of claim 5, further comprising the step of providing a discrete cosine transform to create the ordered matrix of coefficients.

7. A method comprising:
   providing a coded data set;
   converting the coded data set into a data set in memory with a non-raster order scan;
   placing the data set in data processing order by scanning and rearranging the data set in memory into an ordered matrix of coefficients;
   performing frequency weighting in zigzag order on the ordered matrix of coefficients; and
   accessing the rearranged data set in memory in a contiguous manner, and wherein converting the rearranged data set into coded data set further comprises performing bit-plane insertion on the data set in memory.

8. The method of claim 7, further comprising the step of decoding visual data using transform coding on the ordered matrix of coefficients.

9. An article comprising a computer-readable medium which stores computer-executable instructions, the instructions causing a computer to:
   accept a data set including an ordered matrix of coefficients;
   place the data set in data processing order by scanning and rearranging the ordered matrix of coefficients of the data set in memory with a non-raster order scan;
   access the rearranged data set in memory in a contiguous manner to perform bit plane extraction on the rearranged data set in memory;
   perform frequency weighting in a zigzag order on the ordered matrix of coefficients and
   quantize the rearranged data set by discarding a subset of the rearranged data set.

10. The article of claim 9, further comprising the step of storing the rearranged data set in a memory buffer before performing the bit plane extraction step.

11. The article of claim 9, wherein the instructions cause the computer to operate on a data set of visual information, and create a base layer and at least one enhancement layer.

12. The article of claim 9, wherein the instructions cause the computer to encode visual data using transform coding to create the ordered matrix of coefficients.

13. An article comprising a computer-readable medium which stores computer-executable instructions, the instructions causing a computer to:
   accept a coded data set;
   convert the coded data set into a data set in memory with a non-raster order scan;
   place the data set in data processing order by scanning and rearranging the data set in memory into an ordered matrix of coefficients;
   perform frequency weighting in zigzag order on the ordered matrix of coefficients; and access the rearranged data set in memory in a contiguous manner, and wherein the instruction causes the computer to perform bit-plane insertion on the data set in memory.

14. The article of claim 15, wherein the instructions cause the computer to decode visual data using transform coding on the ordered matrix of coefficients.

15. A system comprising:
  a data input module provide a data set including an ordered matrix of coefficients;
  a data scan module to place the data set in data processing order by scanning and rearranging the ordered matrix of coefficients of the data set in memory with a non-raster order scan;
  a bit plane extraction module to operate on the rearranged data set by accessing the rearranged data set in memory in a contiguous manner, wherein frequency weighting is done in zigzag order on the ordered matrix of coefficients; and
  a quantization module to compress the rearranged data set by discarding a subset of the rearranged data set.

16. The system of claim 15, further comprising an encoding module to encode image data using transform coding to create the ordered matrix of coefficients.

17. The system of claim 15, wherein the data scan module stores the rearranged data set in a memory buffer before performing the bit plane extraction step.

18. The system of claim 15, wherein the data set is visual information.

* * * * *

UNITED STATES PATENT AND TRADEMARK OFFICE
CERTIFICATE OF CORRECTION

| | | |
|---|---|---|
| PATENT NO. | : 7,042,942 B2 | Page 1 of 1 |
| APPLICATION NO. | : 10/028402 | |
| DATED | : May 9, 2006 | |
| INVENTOR(S) | : Chen et al. | |

It is certified that error appears in the above-identified patent and that said Letters Patent is hereby corrected as shown below:

In column 9, at line 5, delete "15" and insert --13--.

Signed and Sealed this

Twenty-seventh Day of November, 2007

JON W. DUDAS
*Director of the United States Patent and Trademark Office*